Oct. 30, 1923.  
W. I. STAAF  
RETURN WATER TRAP  
Filed March 6, 1920  
1,472,232  
2 Sheets-Sheet 2

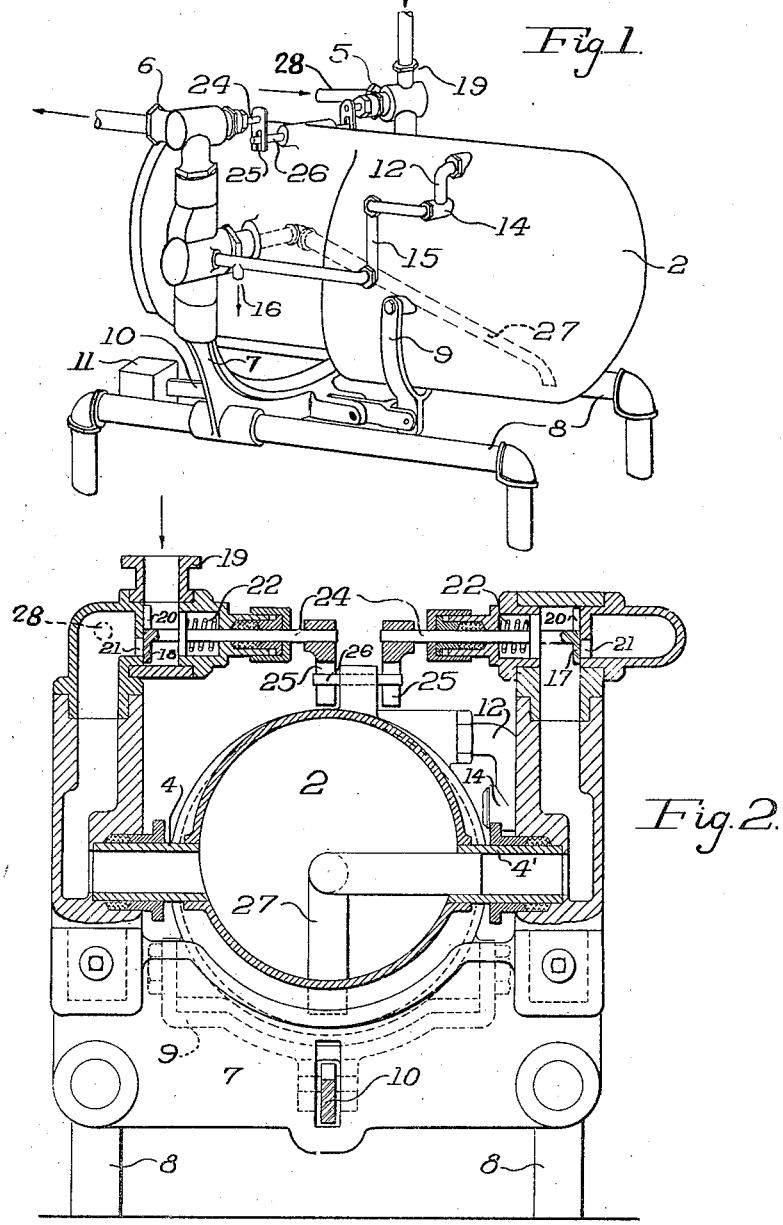

Patented Oct. 30, 1923.

1,472,232

UNITED STATES PATENT OFFICE.

WERNER I. STAAF, OF PITTSBURGH, PENNSYLVANIA, ASSIGNOR, BY MESNE ASSIGNMENTS, OF ONE-HALF TO LULA HARRINGTON TYLER, OF PITTSBURGH, PENNSYLVANIA.

RETURN WATER TRAP.

Application filed March 6, 1920. Serial No. 363,790.

*To all whom it may concern:*

Be it known that I, WERNER I. STAAF, a citizen of the United States, residing at Pittsburgh, in the county of Allegheny and State of Pennsylvania, have invented a new and useful Improvement in Return Water Traps, of which the following is a full, clear, and exact description.

The present invention relates broadly to traps, and more particularly to traps adapted for use in steam heating systems for receiving the water of condensation and boiler feed water, and returning the same to the main power or heating boiler.

One of the principal objects of the present invention is to so mount the trap that the weight thereof is largely eliminated from the trunnions and packing.

An important object of the present invention is to provide a return trap which will automatically discharge and reset itself each time a predetermined amount of water is received thereby.

Another object of the invention is to provide a trap permitting free ingress of water of condensation of boiler feed water until a predetermined amount has been received, after which the trap will be automatically connected to a source of pressure effective for discharging the freed contents therefrom.

Still another object of the invention is to provide an automatically tilting and resetting trap suitably counter-weighted whereby the entire device operates freely with a minimum of wear on the mountings.

A further object of the present invention is to provide a return trap of the character referred to having inlet and outlet connections which form the pivotal mounting for the trap.

The foregoing and other objects, together with their attendant advantages, will be apparent as the invention becomes better understood by references to the accompanying specification and drawings forming a part thereof, it being premised that changes may be made in the various details and the manner of operation within the scope of the appended claims without departing from the spirit of the invention, and in which:

Figure 1 is a perspective view of a trap construction in accordance with the present invention;

Figure 2 is a view partly in section through the trap illustrating the location of the inlet and outlet connections;

Figure 3:
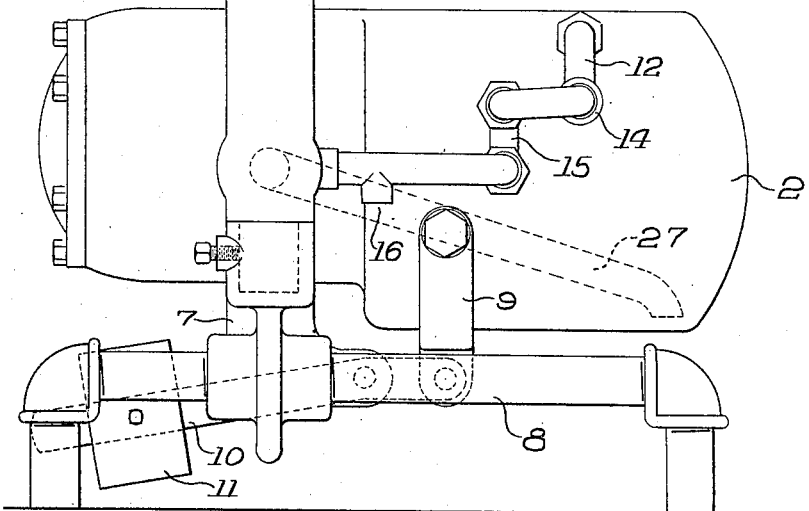
Figure 3 is a side elevation of the trap in normal position.

Referring more particularly to the drawings, there is provided a drum 2 which may be cylindrical in outline, and which is preferably formed to provide a portion of relatively small diameter and a portion of relatively large diameter. Extending into the drum through opposite sides of the portion of the smaller diameter are hollow tubes 4 and 4'. These tubes preferably communicate respectively with an inlet connection 5 and an outlet or discharge connection 6, and form trunnions or pivotal mountings for the drum 2. These trunnions are carried by a cradle 7 supported in any desired manner on a suitable base 8.

For holding the drum 2 normally in the position shown in Figure 3 of the drawings, there is provided a yoke 9 pivotally secured to the portion of the drum of larger diameter and extending beneath the same. Pivotally secured to the yoke 9 is a lever 10 provided on one end with an adjustable counterweight 11 and pivoted adjacent its opposite end in the cradle 7. The yoke 9 is connected to the drum at such a point that the center of gravity of the drum extends therethrough, thereby practically balancing the drum through the counterweight 11 and relieving the trunnions 4 and 4' of the weight pressure. This insures freer operation of the drum, and eliminates to a large extent undue wear on the trunnion packings.

Communicating with the drum at any desired point, is an air relief connection 12 leading to any well known type of rotary valve 14, which is normally in such position that air may pass freely from the interior of the drum through the connection 12 to the valve 14 and then through the pipe 15 to an outlet 16.

The outlet from the drum is normally closed by a rotary disk valve 17, and a similar valve 18 normally shuts off communication with the interior of the drum from a high pressure line 19. In most instances the high pressure line will be connected with a source of steam under pressure. Both of the disk valves 17 and 18 are of usual construction, adapted upon rotation to bring the cutaway portions 20 into communication with the ports 21. The valves are normally held in position against their seats by suitable compression springs 22, and are actuated by rods 24, provided on their opposite ends with bifurcated levers 25 straddling a pin 26 carried by the drum 2.

Upon tilting the drum, the pin 26 will rock the levers 25 and impart the desired rotary movement to the valves 17 and 18.

Communicating with the outlet connection through the trunnion 4' is a downwardly extending nozzle 27 terminating adjacent the bottom of the portion of the drum 2 of larger diameter. When steam pressure is admitted to the interior of the drum, the nozzle 27 is effective for discharging the water therefrom.

Figure 4:
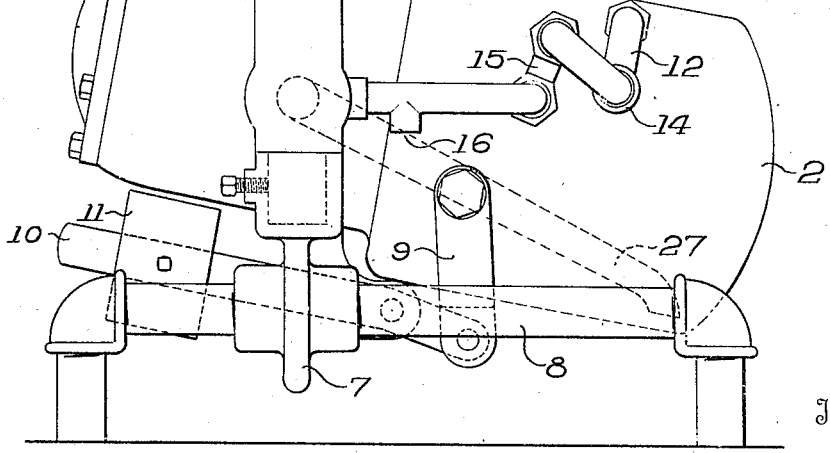
Figure 4 is a side elevation corresponding to Figure 3 of the trap in discharging position.

From the foregoing it will be apparent that the improved trap is connected to the heating system, preferably in a branch of the return to the main power or heating boilers, so that the inlet connection 5 is adapted to receive water of condensation or boiler feed water through the pipe 28 extending into the inlet connection on the opposite side of the valve 18 from the high pressure connection 19. This water, due to the provision of the air relief valve 14, may normally flow into the interior of the drum. This operation will continue until a predetermined amount of water has been received by the drum, whereupon the counterweight 11 will be overcome and the drum will tilt automatically to the position shown more particularly in Figure 4. This will result in rotating the air relief valve 14 and cutting off the escape of air from the interior of the drum. At the same time the valve 17 normally closing the outlet connection 6, and the valve 18 normally cutting off the steam pressure from the interior of the drum, will both be rotated by the mechanism provided, to open the respective ports controlled thereby. This will permit steam to freely enter the interior of the drum and force the water through the outlet connection back into the main power or heating boiler. Both the inlet connection 5 and the outlet connection 6 may be provided with suitable check valves of any usual construction preventing backward flow. As soon as the drum has been discharged, the counterweight will be effective for automatically resetting it.

The advantages of the present invention arise from a construction in which the weight of the drum is carried by a counterweight, thereby enabling all of the parts to move freely. Further advantages arise from the provision of an air escape opening automatically.

Still further advantages arise from the construction and operation of the inlet and outlet connections which serve as trunnions supporting the drum.

I claim:

1. A return trap, comprising a drum having hollow trunnions forming a tilting mounting therefor, a counterweight connected to said drum, a normally open inlet connection communicating with one of said trunnions, a normally closed outlet connection communicating with the other of said trunnions, a high pressure connection, rotary valves normally closing said last two connections, and means operative upon tilting movement of the drum for rotating said valves and opening said connections, substantially as described.

2. A return trap, comprising a drum having a normally opening air escape, hollow trunnions forming a tilting mounting therefor, a counterweight connected to said drum, a normally open inlet connection communicating with one of said trunnions, a normally closed outlet connection communicating with the other of said trunnions, a pressure connection, rotary valves for said last two connections, singular means operative upon tilting movement of the drum for rotating said valves, and means operable simultaneously therewith for closing said air escape, substantially as described.

3. A return trap, comprising a tilting drum having hollow trunnions forming a tilting mounting therefor, a counterweight normally holding said drum against tilting movement, said counterweight relieving the weight of the drum from said trunnions, a fixed connection for each of said trunnions having an opening communicating with the trunnions, and a rotating controlling valve in each of said connections, substantially as described.

4. A return trap, comprising a tilting drum having hollow trunnions pivotally supporting the same, means relieving the weight of the drum from said trunnions, a fixed connection for each of said trunnions having an opening communicating with the hollow trunnions, and a rotating controlling valve in each of said connections, substantially as described.

5. A return trap comprising a tilting drum having hollow trunnions pivotally supporting the same, means relieving the weight of the drum from said trunnions, a fixed connection for each of said trunnions, a rotating controlling valve in each of said connections, and means controlled by the tilting movement of said drum for rotating said controlling valves, substantially as described.

In testimony whereof, I have hereunto set my hand.

WERNER I. STAAF.

Witness:
J. A. YOUNG.